United States Patent [19]
Fast et al.

[11] 3,713,489
[45] Jan. 30, 1973

[54] PLUGGING OF FRACTURES IN UNDERGROUND FORMATIONS

[75] Inventors: Clarence R. Fast; Morton A. Mallinger, both of Tulsa, Okla.

[73] Assignee: Amoco Production Company, Tulsa, Okla.

[22] Filed: Sept. 8, 1970

[21] Appl. No.: 70,100

Related U.S. Application Data

[63] Continuation-in-part of Ser. No. 16,205, March 3, 1970, abandoned.

[52] U.S. Cl...................................166/292, 166/274
[51] Int. Cl.......................E21b 33/138, E21b 43/16
[58] Field of Search......166/268, 271, 281, 273–275, 166/292, 283, 252

[56] References Cited

UNITED STATES PATENTS

| | | |
|---|---|---|
| 3,486,559 | 12/1969 | Flickinger et al......................166/252 |
| 3,281,354 | 10/1966 | Scott et al. ............................166/283 |
| 3,349,844 | 10/1967 | Rhea et al. ............................166/252 |
| 2,945,769 | 7/1960 | Gama et al. ...........................166/292 |
| 2,805,719 | 9/1957 | Anderson...............................166/292 |
| 3,360,046 | 12/1967 | Johnson et al........................166/292 |
| 3,331,438 | 7/1967 | Slusser..............................166/273 X |
| 3,280,912 | 10/1966 | Scheffield, Jr....................166/292 X |
| 3,347,316 | 10/1967 | Havenaar..............................166/292 |

*Primary Examiner*—Stephen J. Novosad
*Attorney*—Paul F. Hawley and John D. Gassett

[57] ABSTRACT

This information concerns a method of selectively plugging fractures in an underground formation by injecting a slurry of finely divided non-settling solids into the fracture. The finely divided solids disclosed are fly ash, amorphous silica, and finely divided limestone. These solids have a particle size smaller than 50 mesh U.S. Standard Sieve Series. Suitable water loss additives and viscosity reducers are disclosed.

17 Claims, 2 Drawing Figures

PLUGGING OF FRACTURES IN UNDERGROUND FORMATIONS

CROSS REFERENCES TO RELATED PATENTS

This application is a continuation-in-part application of co-pending application Ser. No. 16,205 entitled "Plugging of Fractures in Underground Formations," filed Mar. 3, 1970, Clarence R. Fast and Morton A. Mallinger, now abandoned.

A closely related patent is U.S. Pat. No. 3,486,559, patented Dec. 30, 1969.

BACKGROUND OF THE INVENTION

1. Field of the Invention

This invention relates to improved processes for plugging fissures or fractures in underground formations penetrated by a well bore. It particularly concerns the use of such plugging processes for use with secondary recovery operations in which fluid is injected into the formation through one well to displace another fluid, usually oil, to a second well.

2. Setting of the Invention

The secondary recovery operation for which this invention is most suitable is the liquid displacement type, such as waterflood. In waterflood operations, water is injected through an input well into the formation to drive oil toward an output or producing well. In many waterflood projects, the formation has many fractures, either naturally occurring or man-made, existing therein. Too frequently the injected water travels predominantly through such existing fractures. When this occurs the injected water fails to reach the matrix or rock outside the fractures. Consequently, hydrocarbons in such rock or matrix outside the fissures or fractures are largely bypassed or "unswept" by the injected water. Thus, poor sweep efficiency and ineffective hydrocarbon recovery are experienced from the waterflooding operation.

The water bypass problem in those situations has been overcome or at least reduced by plugging such fissures. U.S. Pat. No. 3,486,559 supra, discloses a method of plugging such fractures by injecting a liquid containing finely divided low density non-settling solids into the formation. That patent suggests several suitable finely divided solids such as nutshell flour. While that system has been successfully employed in the field, it nevertheless has a few shortcomings. For example it would be desirable to have a system in which a larger amount of finely divided solids could be carried per unit volume of slurry. We disclose such a process and suitable material which accomplishes this objective. The system disclosed herein is also much more economical. Unless the nutshell flour solids are packed in vertical fractures very tightly, after a long period of time such solids may tend to settle to the bottom of such vertical fractures and may sometimes leave an open channel at the top of the fracture. We disclose material which SETTLES EVEN LESS than the materials disclosed in U.S. Pat. No. 3,486,559 supra.

BRIEF SUMMARY OF THE INVENTION

This is a method of selectively plugging fractures in an inter-well area of an underground formation penetrated by a well bore. A liquid slurry, comprised of water and fly ash, is injected into the formation through the well and at a pressure varying from approximately the fracture opening pressure to below the fracturing pressure required to create a fracture therein. In one embodiment, the slurry includes a mixture of one part cement to between 10 to 40 parts fly ash. This slurry is pumpable, non-settling, yet gains compressive strength in the order of 100 psi or more. Another slurry can be made using a very fine limestone rock obtained from rock crushers that produce aggregates for concrete. This fine limestone rock should pass through a 50 mesh U.S. Standard Sieve Series screen. A third material is amorphous silica available as a by-product in the manufacture of silicon metal as 95 percent silicon dioxide. Fluid loss additives and viscosity reducers or dispersants can be added to the slurry.

BRIEF DESCRIPTION OF THE DRAWINGS

A better understanding of the information and various modifications and objects thereof can be made from the following descriptions taken in conjunction with the drawings in which.

DETAILED DESCRIPTION OF THE INVENTION

Figure 1:
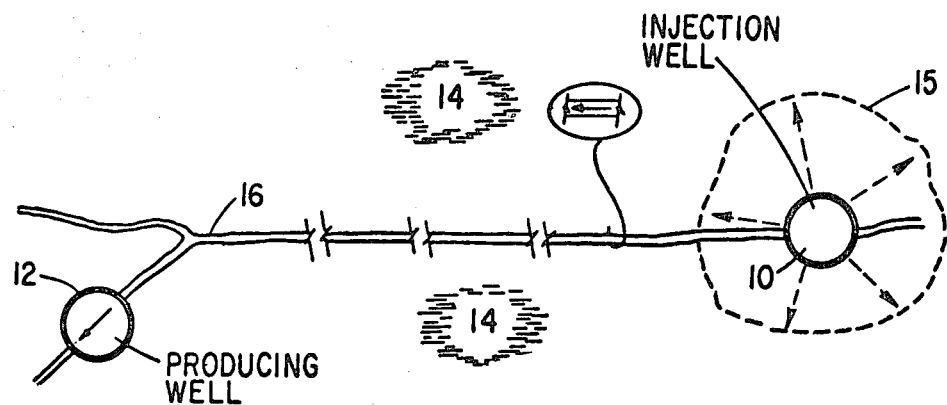
FIG. 1 is a horizontal section view of an underground formation illustrating a fracture between two wells before treatment.
Figure 2:
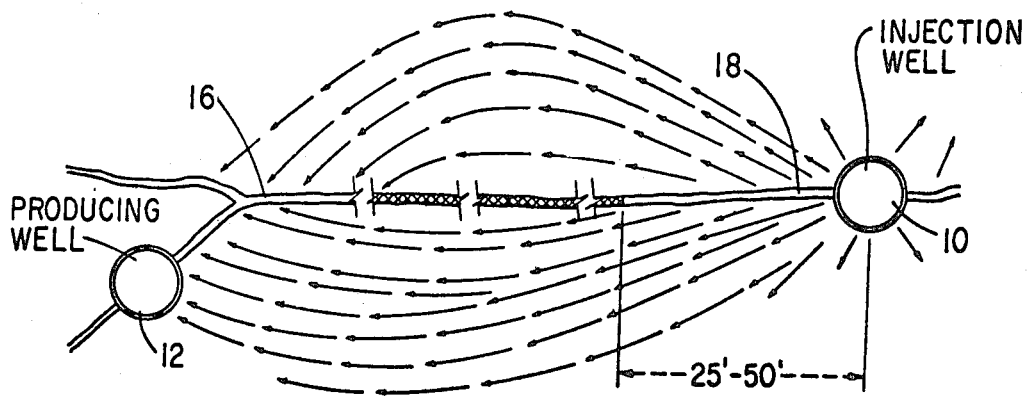
FIG. 2 illustrates the fracture system of FIG. 1 after treatment according to the invention.

FIG. 1 illustrates an injection or an input well 10 and an output or producing well 12, each of which has penetrated hydrocarbon-containing formation 14. This is a top view of a horizontal section through the formation. As illustrated, there is a fracturing system 16 which connects the two well bores. In a waterflood operation, for example, water is injected into well 10 and it is desired that the water "fan out" and sweep oil from a wide portion of formation 14, as indicated by the dotted line 15, to the producing well 12. However, this is not easily attained when the reservoir has a fracture, because the water always takes the path of least resistance, and here the least resistance is through the fracture 16. The idea, then, is to plug fracture 16 so that the water has to go through the rock matrix. In the past this has been attempted by various means, for example, by plugging selected intervals adjacent the well bore 10. However, if only a small portion of the fracture 16 is sealed adjacent the injection well bore 10, it merely makes injection harder; that is, the injection rate is lowered for a given pressure, and the water will bypass the plugged portion and re-enter the fissure 16, resulting in only a nominal gain in reservoir sweep efficiency. It is therefore desirable to plug fracture 16 for an appreciable distance so that such re-entry into the fracture will not occur for a considerable distance from the injection well.

We plug fracture 16 so that the injected water in the water drive project does not return to it but rather goes through the matrix. In accordance with our invention in treating a well having such fractures, we inject a carrier liquid containing finely divided, non-settling solids into the fracture 16 through well 10 at a pressure above the fracture opening pressure to increase the opening of fracture 16 so that it will more readily accept the finely divided solids. The opened fracture 16 may be 1/10 inch or wider for example. We exercise care to keep the pressure in the well bore during slurry injection below the fracturing pressure so that we will not make new fractures for the water to channel through. The injected solids are selected from a group including fly ash, amorphous silica, or finely divided limestone flour or dust. These solids pass through a 50 mesh screen. Fly ash has been found to be particularly preferred. By non-settling solids it is meant that the solids have less than three percent settling in the carrier fluid for a period of one day.

The carrier fluid or slurry is injected in the formation until the solids have been carried the desired distance into the fracture. One way of knowing when the desired distance has been penetrated is by first determining the volume of the fracture system and then injecting a proportion of the carrier liquid containing the solids sufficient to penetrate the desired distance. The fracture volume can be approximated by injecting a liquid containing a tracer element and carefully measuring the quantity of the injected liquid until the tracer element appears at an output well.

As mentioned above the best material found so far by us for use in plugging these fractures is a fly ash slurry. Fly ash is an unburned product from coal fired power plants. It is largely silicon dioxide. Fly ash is a very well known product and has a density of about 2.6 gm. per cubic centimeter. The properties of fly ash may vary slightly depending upon the source of the coal burned. When fly ash is to be used we first determine the settling and pumpability characteristics of slurries containing various concentrations of fly ash in water. The fly ash is added to a given quantity of water and the density of the resulting slurry is determined. The settling characteristics are measured by allowing the slurry to stand in a covered graduated cylinder. The quantity of free water that collects on the top is expressed as a percent of the total volume. The rheological properties of the slurry are measured on a rotational viscosimeter such as the Fann VG meter Model 35 which is described in Section 10 API RP 10B, April, 1969, "Recommended Practice for Testing Oil Well Cements and Cement Additives." An easily pumpable slurry with a minimum percent free water is selected.

Water is the most common carrier for our fly ash slurry. We ordinarily use as much fly ash per volume of water as possible which will result in a slurry that is readily pumpable and will yield about 3 percent or less free water over a period of 24 hours. This requires about 18 to 26 pounds of fly ash per gallon of water depending on the source of fly ash. As we have mentioned above we want to stay below the fracturing pressure of the formation during the plugging treatment. The fracturing pressure of a formation is ordinarily about 1 psi per foot of depth. The pressure during injection will generally stay below the fracturing pressure unless the slurry dehydrates in the fracture and plugs it. This can be determined by computing the bottom hole pressure during injection by adding the surface pressure to the hydrostatic pressure and subtracting the pumping friction pressure. The surface pressure can be determined by installing a gage on the well head, the hydrostatic pressure can be calculated from the slurry density and the pumping friction pressure from the rehological properties of the slurry. We then inject the fly ash slurry which will ordinarily contain 22 pounds of fly ash per gallon of water, resulting in a slurry density of about 15 pounds per gallon, into the formation at a pressure that is above the fracture opening pressure. The fracture opening pressure is normally about 40 to 80 percent of the fracturing pressure. This pumping is continued until the desired amount of plugging fluid has been injected. It is ordinarily desired that the portion 18 of fracture 16 be left unplugged to aid in the subsequent water injection rate. Portion 18 preferably extends a distance varying for example from 25 to 50 feet into the formation. To maintain this portion 18 in an unplugged condition the solids are driven a selected distance from the well bore by fluid such as solid-free water. Other fluids may be used, such as viscous guar gum solutions having 10 to 80 pounds of guar gum per thousand of gallons of water, and an enzyme to promote hydrolysis under reservoir conditions. As the guar gum water mixture is rather viscous it is very effective for displacing the solids farther into the fissures. However, after a period of time the guar gum gel will liquefy.

Various modifications of our injection can be made. For example, if we wish to insure that the fly ash obtain some compressive strength, we can readily obtain this by the addition of a small amount of cement or hydrated lime. We have found in our laboratory and field work that a mixture of one part cement to 10 to 40 parts fly ash produces a pumpable non-settling slurry that plugs fractures yet gains 100 psi or more compressive strength. One advantage that this slurry with the cement added to the fly ash has over neat fly ash alone is that after it sets, the injection of water does not move it from its position in the fracture. This is particularly advantageous where only the bottom part of a vertical fracture need be plugged. For example, such a condition exists in the Slaughter Field of West Texas where vertical fractures extend from the hydrocarbon producing formation into the underlying aquifer.

Further modifications can be made of the use of the fly ash. For example, three slurries can be injected. First a cement-free fly ash slurry is injected as described above. This is followed by the injection of a volume of cement slurry that is reasonably sufficient to hold the fly ash slurry in place and prevent invasion by water and prevent movement. The third slurry which is to be injected in this modification is a fly ash slurry. Sometimes the additional injection of water will be of such pressure to cause the fracture to open. This causes the cement to part from the wall of the fracture when the walls of the fracture are so expanded. This could permit water to channel by the cement. However, if a third slurry is injected which has fly ash in it, the fly ash is carried into such cracks and plugs them.

The use of a system employing our invention to plug fractures has been field tested. Two wells completed in the Oologah formation at our Bird Creek, Tulsa County, Oklahoma, test site, containing extensive fracture systems produced by previous explosive fracturing tests, were successfully plugged using fly ash-cement and neat fly ash-water slurries.

The fractures in the first well were plugged in two stages. The first stage consisted of 20,000 pounds of fly ash and 1000 pounds of cement mixed in a 15 lb/gal slurry overflushed with 2 bbls of self-liquefying guar gum water gel. This overflushing displaced the plugging material from the well and fractures adjacent to the bore and pushed it deeper into the fractures. This stage resulted in a reduction in water injectivity to 7.1 gal/min/psi from a pre-treatment water injectivity of 15.1 gal/min/psi. A second stage treatment using a hesitation pumping procedure with 6000 pounds of neat fly ash-water slurry overflushed with 1 bbl of guar gum-water gel at a final squeeze pressure of 1800 psi resulted in the water injectivity being reduced to 0.03 gal/min/psi. The hesitation pumping procedure involved intermittently stopping the pumps during the final stages of slurry injection. The pumps were alternately stopped and started with the pressure at the time of each stop being necessarily higher until a high final squeeze pressure was achieved. A final bottom hole pressure in a deep well of about 1.0 psi per foot of depth is desired.

The high capacity fracture system in the second well was successfully plugged with one treatment using 115 cu. ft. of 15 lb/gal fly ash-water slurry injected by using a slow pumping, squeeze cementing procedure. Water injectivity was reduced to 0.1 gal/min/psi from 1.9 gal/min/psi by this treatment which indicated the success of the plugging.

In the above described fracture plugging treatments the fly ash water slurries did not contain additives to reduce the water loss of the slurry into the formation. However, if this type treatment is conducted in areas where the formation permeability is high, e.g., about 30 md or more, it is necessary to use additives to reduce the water loss of the slurries. One such additive is Halad 9, a cellulose derivative, commercially available from Halliburton Company and described in U.S. Pat. No. 3,132,693. This material is used in a concentration in the range of from about 0.5 to 1.3 percent by weight of fly ash. Another cellulose derivative water loss additive is commercially available from Dow Chemical Company and is called Dowell's D-70. Another commercially available additive is Dowell's D-73, a high molecular weight polymer of the polyethylenimine. D-70 and D-73 can be used in a concentration in the range of from about 0.1 to 0.4 gallons per 74 pound sack of fly ash. These additives can reduce the water loss of the fly ash slurry to a value of less than 100 cc in 30 minutes when tested in a standard filter press having a volume of 600 cc at a ΔP of 100 psi using Whatman No. 50 or No. 52 filter paper.

It has also been found that some fly ash slurries have high apparent viscosities. The viscosity of these slurries can be reduced by using either liquid or solid dispersing agents that are commonly used in cements. An example is Dowell's D-80 additive, a liquid dispersant which is a sodium salt of alkyl aryl sulfonate and is used in the concentration of about 0.02 to 0.05 gallons per 74 pound sack of fly ash. The D-80 dispersant must be used with D-70 for the D-70 to effectively reduce water loss. Dowell's dispersant D-65, a sodium salt of napthelene sulfonic acid in powder form must be used with D-73 for the D-73 to effectively reduce water loss.

As mentioned above, another material for fracture plugging not heretofore known can be made using agricultural limestone. This material is a very fine limestone rock obtained from rock crushers that produce aggregates for concrete. The limestone should be screened through a 50 mesh screen to remove any large particles that might tend to bridge in formation fractures. This slurry can be mixed at a quantity of about 26 pounds per gallon of water. This results in a slurry which has a weight of about 16 pounds per gallon. We have further found that if such limestone is mixed in a ratio of 1 part cement to 10 to 20 parts limestone that a setable and pumpable fracture pumping slurry is produced. The techniques for injecting the limestone type slurry are essentially the same as that described above for the fly ash.

Another material suitable for fracture plugging is amorphous silica. This material is available in the Northwest and in the Midwest as a by-product from the production of silicon metal in the form of 95 percent silicon dioxide and 2 percent carbon. It has a low bulk density of 12-14 pounds per cubic foot and a corresponding high surface area with a particle diameter averaging 100 millimicrons. At concentrations as low as 10 pounds per gallon of water, zero free water is obtained.

We have found that the fly ash and also limestone particles are superior to nutshell flour for use in plugging a fracture. Pumpable nutshell flour water slurries generally have a settling factor greater than 25 percent per 24 hours. Fly ash slurries on the other hand have a settling factor of only about 0 to 4 percent for a 24 hour period of time. In fact we can say that fly ash is essentially non-settling. Our experiences have shown that when a minimum amount of fly ash, e.g., a fly ash-water slurry with a density of 14.7 pounds per gallon of water was used, the fly ash had a settling factor of only about 4 percent per 24 hours. When a maximum fly ash-water density, about 15.2 pounds per gallon of water, was used, the fly ash had a settling factor of about zero.

We have also found that we can get considerably more fly ash in a pumpable slurry than we can nutshell flour. The maximum amount of nutshell flour which we can get in a gallon of water is about 6 pounds and still maintain a pumpable slurry.

Another material which we have found which is superior to nutshell flour as a plugging material is the above mentioned fine limestone rock. Pumpable slurries of limestone and water can obtain up to about 25 pounds of limestone per gallon of slurry. Such slurries exhibit low settling properties; for example, our tests have shown that for a maximum pumpable amount of limestone in a slurry of about 25 pounds per gallon of slurry, the settling ratio was about 8.5 percent per 24 hours.

While the above invention has been disclosed in detail, other embodiments may be made thereto without departing from the spirit and the scope of the invention.

We claim:

1. A method of plugging a fracture in an inter-well area of an underground formation penetrated by a well bore which comprises the step of injecting a liquid slurry containing fly ash into said formation through said well at a pressure in the range from the fracture opening pressure to below the pressure required to create a fracture therein, said liquid slurry includes water as the carrier fluid containing about 18 to 26 pounds of fly ash per gallon of water.

2. A method as defined in claim 1 in which the solids of the slurry contain a mixture of 1 part cement to between about 10 to about 40 parts fly ash.

3. A method as defined in claim 1 in which the slurry is displaced away from the well bore.

4. A method as defined in claim 1 in which the liquid slurry contains a water loss additive.

5. A method of plugging a fracture in an inter-well area of an underground formation penetrated by a well bore which comprises the step of injecting a liquid slurry containing fly ash into said formation through said well at a pressure in the range from the fracture opening pressure to below the pressure required to create a fracture therein and injecting a slug of cement into said fracture after the injection of said fly ash slurry.

6. A method as defined in claim 5 including the step thereafter injecting a second slurry of fly ash and thereafter injecting a driving fluid through said well.

7. A method as defined in claim 6 in which said liquid slurry contains a fluid loss additive and a viscosity reducing agent.

8. A method as defined in claim 7 in which said fluid loss additive is a cellulose derivative and is used in a concentration in the range from about 0.5 to 1.3 percent by weight of fly ash.

9. A method of plugging a fracture in an inter-well area of an underground formation penetrated by a well bore which comprises the step of injecting a liquid slurry containing fly ash into said formation through said well at a pressure in the range from the fracture opening pressure to below the pressure required to create a fracture therein and in which the liquid slurry includes water as the carrier fluid and contains a viscosity reducing agent.

10. A method as defined in claim 9 in which the viscosity reducing agent is a sodium salt of alkyl aryl sulfonate used in a concentration in the range from about 0.02 to 0.05 gallons per 74 pounds of fly ash.

11. A method of plugging an inter-wall area of an underground formation having fractures therein and penetrated by a well bore which comprises the step of injecting a liquid slurry having a water base containing finely divided non-settling solids into said formation through said well at a pressure in the range from the fracture opening pressure to below the fracture creating pressure, said solids selected from a group consisting of fly ash, amorphous silica, and powdered limestone, which solids pass a 50 mesh sieve, U.S. Standard Sieve Series, the "filtrate" of said liquid of the slurry being of a type to readily penetrate the walls of said fracture, the slurry having at least about 10 pounds of such selected solids per gallon of water.

12. A method as defined in claim 11 in which the slurry is displaced away from the well bore by injection of a displacing fluid.

13. A method as defined in claim 11 including the step of adding to said liquid slurry, a water loss additive in the amount of 0.5 to 1.3 percent by weight of the solids.

14. A method as defined in claim 13 including the step of adding to said slurry a viscosity reducer in the concentration of about 0.02 to 0.05 gallon per 74 pound sack of solids.

15. A method of plugging a fracture in an inter-well area of an underground formation penetrated by a well bore which comprises the step of injecting a liquid slurry containing powdered limestone which passes a 50 mesh sieve, U. S. Standard Sieve Series, into said formation through said well at a pressure in the range from the fracture opening pressure to below the pressure required to create a fracture therein and injecting a slug of cement into said fracture after the injection of said limestone slurry.

16. A method as defined in claim 15 including the step of thereafter injecting a second slurry of limestone and thereafter injecting a driving fluid through said well.

17. A method as defined in claim 15 including the step of adding a viscosity reducing agent to the slurry in the concentration of about 0.02 to 0.05 gallon per 74 pounds of solid.

* * * * *